3,282,942
SUBSTITUTED CYCLOALKANOINDOLES
Leonard M. Rice, Baltimore, Md., and Meier E. Freed, Philadelphia, Pa., assignors to American Home Products Corporation, New York, N.Y., a corporation of Delaware
No Drawing. Filed Oct. 24, 1961, Ser. No. 147,190
14 Claims. (Cl. 260—268)

This invention relates to novel compounds possessing valuable pharmacological properties affecting the central nervous system. They are of value as antidepressants, as inhibitors of appetite (especially in combination with amphetamine or other phenethylamine derivatives), and as antihistamines. Additionally, they have useful ataractic or tranquilizing action, and some exhibit analgesic-like action.

The pharmacologically valuable compounds of this invention are N-substituted 2,3-polymethyleneindoles and may be represented by the following formula:

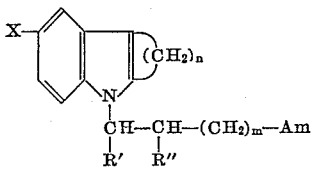

wherein X represents hydrogen, halogen, methyl, nitro, amino, hydroxy, or lower alkoxy, $m$ is an integer of from zero to four, inclusive, preferably zero to one, $n$ is an integer of from five to thirteen, inclusive, preferably from five to eight, R' is hydrogen or phenyl, R" is hydrogen or methyl, and Am is a primary, secondary, or tertiary amino radical containing no more than about eight carbon atoms; thus Am may represent an unsubstituted —$NH_2$ radical, an —$NH_2$ radical substituted by one or two lower alkyl or hydroxy lower alkyl radicals, or a cyclic amino radical such as the morpholino, piperidino, pyrrolidino, piperazino, N-lower alkyl piperazino, and N-(lower hydroxyalkyl)-piperazino radicals.

The above defined compounds, it will be noted, are aliphatic amines, and are preferably administered in the form of their salts with pharmaceutically acceptable acids, which may include acids such as hydrochloric, hydrobromic, sulfuric, phosphoric, citric, malic, maleic, propionic, acetic, or fumaric, etc.

The compounds of this invention may be prepared by relatively simple procedures from the corresponding 2,3-polymethyleneindoles having the formula

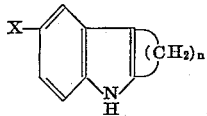

where X and $n$ have the above meanings.

A convenient method is to convert the parent 2,3-polymethyleneindole to its sodio derivative by treatment with sodium hydride, and then to contact this with an appropriate dialkylaminoalkyl halide, resulting in the formation of the N-(dialkylaminoalkyl)-2,3-polymethyleneindole compound of this invention. In some instances it is more convenient to prepare the N-(haloalkyl) polymethyleneindole and then permit this to react with a suitable amino compound with elimination of the elements of a molecule of hydrogen halide.

The new pharmacologically active compounds of this invention may be administered parenterally or orally after being combined with suitable solvents, carriers, buffers, fillers, etc.

The preparation of the compounds of this invention is illustrated by the following examples.

EXAMPLE 1

1-(gamma-dimethylaminopropyl)-2,3-pentamethyleneindole

A solution of 2,3-pentamethyleneindole (18.53 grams, 0.1 mole) in 100 cc. of dimethylformamide is added slowly to 2.9 grams (0.12 mole) of sodium hydride (as 6 grams of 48% dispersion), suspended in 50 cc. of dimethylformamide by vigorous stirring. The temperature is slowly elevated to 30–35° C. until hydrogen is no longer evolved. Freshly distilled gamma-dimethylaminopropylchloride (12.1 grams, 0.1 mole) is then added to the suspension of 1-sodio-2,3-pentamethyleneindole and the mixture stirred and heated to 50° C. for 6 hours. The reaction is quenched by pouring into 300 cc. of ice-water. This is extracted 3 times with 200 cc. ether. The ether layer is washed with saturated sodium chloride solution, and then washed well with 2 N hydrochloric acid. This aqueous acid extract is washed with a little ether and then made basic and re-extracted with ether. This ether extract is dried, the solvent evaporated, and the residue is dissolved in absolute ethanol; dry hydrogen chloride is passed through until the solution is strongly acidic, and the resulting precipitate is then removed by filtration. After recrystallization from ethanol-acetone the hydrochloride melts at 207–208° C.

Analysis.—Calculated for $C_{18}H_{27}N_3Cl$: N, 9.13%; Cl, 11.57%. Found: N, 9.25%; Cl, 11.60%.

EXAMPLE 2

1-(gamma-dipropylaminopropyl)-2,3-pentamethyleneindole

Gamma-dipropylaminopropylchloride (17.7 grams, 0.1 mole) is added to a stirred suspension of 1-sodio-2,3-pentamethyleneindole (20.18 grams, 0.1 mole, prepared in the usual manner from 18.5 grams of 2,3-pentamethyleneindole and 6 grams of 48% sodium hydride dispersion) is 150 ml. of dimethylformamide. After stirring for 6 hours at 35–40° C. the mixture is poured into ice-water and the oil layer extracted with ether. After being washed with aqueous sodium chloride solution the ether extract is washed several times with 100 ml. portions of 2 N hydrochloric acid. The ether layer is discarded; the aqueous acid is basified with sodium hydroxide and the oil extracted into ether. The ethereal solution is washed with aqueous chloride and dried over anhydrous sodium sulfate. After removing the solvent the product is obtained by vacuum distillation as a viscous yellow oil, B.P. 180–183° C./0.1 mm.

Analysis.—Calculated for $C_{22}H_{34}N_2$: C, 81.15%; H, 10.48%; N, 8.57%. Found: C, 81.43%; H, 10.32%; N, 8.72%.

Maleic acid salt (from $CH_2Cl_2$—$Et_2O$) M.P.: 101–102.

Analysis.—Calculated for $C_{26}H_{38}N_2O_4$: C, 70.60%; H, 8.62%; N, 6.33%. Found: C, 70.74%; H, 8.68%; N, 6.43%.

Treatment of 5.0 grams of the base in 50 ml. of isopropanol with 5 ml. of methyl iodide yields a white crystalline methiodide, M.P. 186–187° C.

Analysis.—Calculated for $C_{23}H_{37}N_3I$: N, 6.00%. Found: N, 5.72%.

EXAMPLE 3

1-(gamma-dimethylaminopropyl)-2,3-hexamethyleneindole

Gamma-dimethylaminopropylchloride (12.1 grams, 0.1 mole) is added to a well-stirred suspension of 5-sodio-2,3-hexamethyleneindole (from 19.5 grams, 0.1 mole of 2,3-hexamethyleneindole and 6 grams, 0.1 mole, of 48% sodium hydride dispersion) in 150 cc. of dimethylformamide. After 6 hours, the reaction mixture is poured into 500 cc. of ice-water and the oil layer extracted into ether. The ether extract is washed with water and the aqueous fraction discarded. The ether solution is then extracted with N HCl until acidic, then with water. The aqueous acid solution is washed with ether. After basifying the aqueous solution, the product is extracted into ether, and the ether solution washed with water and dried. Concentration yields an orange oil. This is dissolved in absolute ethanol, and dry HCl is added until strongly acidic. On addition of ether the product hydrochloride crystallizes out. After recrystallization from ethanol-ethyl acetate-ether it melts at 146–147° C. Yield: 14.9 grams (46.7%).

*Analysis.*—Calculated for $C_{19}H_{29}N_2Cl$: N, 8.7%; Cl, 11.06%. Found: N, 8.59%; Cl, 10.90%.

In a similar manner, 1-(gamma-dimethylamino-beta-methylpropyl)-2,3-hexamethyleneindole may be prepared from the sodio derivative of 2,3-hexamethyleneindole and gamma-dimethylamino-beta-methylpropyl chloride.

EXAMPLE 4

*1-(beta-dimethylaminopropyl)-2,3-pentamethyleneindole*

18.5 grams (0.1 mole) of 2,3-pentamethyleneindole and 6 grams sodium hydride dispersion (48%, 0.12 mole) in 100 cc. of dimethylformamide is stirred and warmed to 40° C. To this is added 12.1 grams (0.1 mole) of dimethylaminoisopropyl chloride and the reaction mixture is stirred and warmed (40° C.) for 6 hours. The suspension is poured into ice-water (250 cc.) and acidified with concentrated hydrochloric acid. The hydrochloride product crystallizes from the solution the solution, is separated by filtration, and recrystallized from absolute ethanol. M.P.: 189–190° C. Yield: 15.5 grams (50.5%).

*Analysis.*—Calculated for $C_{18}H_{27}ClN_2$: N, 9.13%; Cl, 11.57%. Found: N, 9.13%; Cl, 11.53%.

EXAMPLE 5

*1-(beta-piperidinoethyl)-2,3-pentamethyleneindole*

A solution of 18 grams (0.1 mole) 2,3-pentamethyleneindole in 50 ml. of dimethylformamide is added slowly to 6 grams of 48% sodium hydride dispersion suspended in 50 ml. of the same solvent. This is stirred at 30–35° C. until the evolution of hydrogen ceases. To the stirred suspension is added 14.7 grams (0.1 mole) of freshly distilled 1-(beta-chloroethyl)piperidine. After 16 hours the contents of the flask are poured into 300 cc. of ice-water and acidified with concentrated hydrochloric acid. The solution is then extracted well with ether to remove non-basic components. The aqueous acid solution is then made alkaline with 40% sodium hydroxide and the oil which separates extracted into ether. The ether solution is then washed with saturated salt solution and dried over sodium sulfate. The solvent is removed and the residual oil dissolved in 50 cc. of ethanol. Dry hydrogen chloride is bubbled thru the solution until acidic. Acetone is then added until crystallization occurs. The product is filtered off, washed with ethanol-acetone, then with acetone and dried at 80° C./0.2 mm. The hydrochloride salt has M.P. 209–210°. Yield: 15.8 grams (48.3%).

*Analysis.*—Calculated for $C_{20}H_{29}ClN_2$: N, 8.44%; Cl, 10.66%. Found: N, 8.43%; Cl, 10.42%.

EXAMPLE 6

*1-(beta-diethylaminoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.12 mole) dispersion (48%) in 50 ml. of the same solvent. The temperature is slowly elevated by heating to 30–35° until hydrogen is no longer evolved. Freshly distilled diethylaminoethylchloride (12.1 grams, 0.1 mole) is then added drop-wise and the mixture stirred and heated to 50° for 6 hours. The reaction is quenched by pouring into 300 ml. of ice-water. Concentrated hydrochloric acid is added until a nearly clear solution results (15–20 ml.) and this is extracted several times with ether. The aqueous layer is made strongly alkaline and the product taken up in ether. The ethereal solution is washed with a saturated aqueous solution of sodium chloride, dried, and the solvent removed under reduced pressure. The product is dissolved in 50 ml. of isopropanol, and fumaric acid (4.8 grams) in 200 ml. isopropanol is added. The resulting salt is recrystallized from isopropanol. Yield: 13.8 grams (34.5%) M.P.: 187–188°.

*Analysis.*—Calculated for $C_{23}H_{32}N_2O_4$: C, 69.20%; H, 8.05%; N, 6.98%. Found: C, 69.48%; H, 8.02%; N, 7.28%.

Treatment of 5.0 grams of the base in 50 ml. of isopropanol with 5 ml. of methyl iodide yields a white crystalline methiodide. M.P.: 186–187°.

*Analysis.*—Calculated for $C_{20}H_{31}IN_2$: N, 6.58%; I, 29.55%. Found: N, 6.65%; I, 29.15%.

EXAMPLE 7

*1-(beta-morpholinoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.1 mole) dispersion (48%) in 50 ml. of the same solvent. The temperature is slowly elevated by heating to 30–35° until hydrogen is no longer evolved. Freshly distilled 1-(beta-chloroethyl) morpholine (14.9 grams, 0.1 mole) is then added drop-wise and the mixture stirred and heated to 50° for 6 hours. The reaction is quenched by pouring into 300 ml. of ice-water. Concentrated hydrochloric acid is added until the mixture is acidic (15–20 ml.) and it is then extracted several times with ether. The aqueous layer is separated, and on standing the hydrochloride salt precipitates. The precipitate is collected on a funnel, washed with cold water, and dried. The salt is recrystallized from dilute hydrochloric acid. Yield: 24 grams (71.6%). M.P.: 181–182°.

*Analysis.*—Calculated for $C_{19}H_{27}ClN_2O$: N, 8.37%; Cl, 10.58%. Found: N, 8.35%; Cl, 10.45%.

EXAMPLE 8

*1-(beta-pyrrolidinoethyl)-2,3-pentamethyleneindole*

A solution of 2,3-pentamethyleneindole (18.53 grams, 0.1 mole) in 100 ml. of dimethylformamide is added slowly to a well-stirred suspension of sodium hydride (6 grams, 0.12 mole) dispersion (48%) in 50 ml. of the same solvent. The temperature is slowly elevated by heating to 30–35° until hydrogen is no longer evolved. Freshly distilled 1-(beta-chloroethyl) pyrrolidine (13.5 grams, 0.1 mole) is then added drop-wise and the mixture stirred and heated to 50° for 6 hours. The reaction is quenched by pouring into 300 ml. of ice-water. Concentrated hydrochloric acid is added until a nearly clear solution results (15–20 ml.) and this is extracted several times with ether. The aqueous layer is made strongly alkaline and the product taken up in ether. The ethereal solution is washed with a saturated aqueous solution of sodium chloride, dried, and the solvent removed under reduced pressure. Distillation of the residue yields 9 grams of base, B.P.: 193–6/.2 mm. The product is dissolved in 50 ml. of acetone and converted to an acid addition salt by addition to a hot solution of fumaric acid in 250 ml. of acetone. Yield: 13 grams (32.6%) M.P.: 244–245°.

*Analysis.*—Calculated for $C_{23}H_{30}N_2O_4$: C, 69.30%; H, 7.55%; N, 7.03%. Found: C, 69.20%; H, 7.41%; N, 7.15%.

EXAMPLE 9

*1-(gamma-aminopropyl)-2,3-pentamethyleneindole*

(a) Acrylonitrile, 11 grams (0.2 mole), is added slowly with cooling to a solution of 2,3-pentamethyleneindole, 37 grams (0.2 mole), and 4 ml. of trimethylbenzylammonium methoxide (40% in methanol) in 100 ml. of benzene. The reaction temperature reaches 50° and then drops slowly. After stirring for an additional hour, 5 ml. of concentrated hydrochloric acid is added. The benzene solution is washed well with water, and then dried over sodium sulfate. The solution is concentrated and the residue crystallized from acetone-methanol. Yield of 1-(beta-cyanoethyl)-2,3-pentamethyleneindole: 27 grams (56.6%), M.P.: 95–96°.

*Analysis.*—Calculated for $C_{16}H_{18}N_2$: C, 80.50%; H, 7.60%; N, 11.78%. Found: C, 80.41%; H, 7.64%; N, 11.76%.

(b) A solution of 24 grams (0.1 mole) of 1-(beta-cyanoethyl)-2,3-pentamethyleneindole in 100 ml. of dry benzene is added slowly to a stirred suspension of 6 grams of lithium aluminum hydride (0.15 mole) in 500 ml. of dry ether. The mixture is heated to reflux and stirred overnight. Water, 30 ml., is added slowly with cooling. One hour after addition is completed the mixture is filtered and the filtercake washed well with either. After removing the solvent the residue is distilled. This yields 20 grams (81.5%) 1-(gamma-amino-propyl)-2,3-pentamethyleneindole, B.P.: 190–192/0.7 mm.

*Analysis.*—Calculated for $C_{16}H_{22}N_2$: C, 79.25%; H, 9.22%; N, 11.58%. Found: C, 78.99%; H, 9.18%; N, 11.61%.

A sample is converted to the hydrochloride salt which is recrystallized from methanol-acetone; M.P. 271–272°.

*Analysis.*—Calculated for $C_{16}H_{23}ClN_2$: N, 10.05%; Cl, 12.72%. Found: N, 10.15%; Cl, 12.75%.

EXAMPLE 10

*2-(gamma-dimethylaminopropyl)-2,3-pentamethylene-5-fluoroindole hydrochloride*

This is prepared in the manner of Example 1 using 10.15 grams (0.05 mole) of 2,3-pentamethylene-5-fluoroindole, 3 grams sodium hydride (48%), and 6.08 grams of gamma-dimethylaminopropylchloride in 75 cc. of dimethylformamide. The product (base) has B.P.: 178–180°/.3 mm.; product (hydrochloride) has M.P.: 177–178°.

*Analysis.*—Calculated for $C_{18}H_{25}N_2F$ (base): C, 74.95%; H, 8.73%; N, 9.70%. Found: C, 74.75%; H, 8.76%; N, 9.72%. Calculated for $C_{18}H_{26}N_2FCl$ (hydrochloride): N, 8.64%; Cl, 10.92%. Found: N, 8.65%; Cl, 10.92%.

The 2,3-pentamethylene-5-fluoroindole used as starting material in the example is prepared from p-fluorophenylhydrazine and cycloheptanone according to the procedure outlined in the second paragraph of Example 11. It melts at 114–115° C.

*Analysis.*—Calculated for $C_{13}H_{14}FN$: C, 76.80%; H, 6.96%; N, 6.90%. Found: C, 76.80%; H, 7.02%; N, 7.06%.

EXAMPLE 11

*1-(gamma-dimethylaminopropyl)-2,3-pentamethylene-5-chloroindole*

This is prepared as per Example 1, using 11 grams (0.05 mole) of 2,3-pentamethylene-5-chloroindole, 3 grams sodium hydride (48%) and 6.08 grams gamma-dimethylaminopropylchloride. The product (base) has a B.P. of 185–188°/.05 mm. yield: 9.5 grams (62.5%). The fumaric acid salt has M.P. 141–142°.

*Analysis.*—Calculated for $C_{18}H_{25}N_2Cl$ (base): C, 70.80%; H, 8.26%; N, 9.18%. Found: C, 70.88%; H, 7.94%; N, 9.17%. Calculated for $C_{22}H_{29}O_4N_2Cl$ (fumarate): C, 62.80%; H, 6.94; N, 6.67%. Found: C, 62.69%; H, 6.82%; N, 6.61%.

To prepare the 2,3-pentamethylene-5-chloroindole employed as starting material in the preparation, 44 g. of p-chlorophenylhydrazine (0.31 mole) is added to 34 g. (0.31 mole) of cycloheptanone in 250 ml. of glacial acetic acid, and the mixture is heated under reflux for two hours and then cooled. The crystalline product is filtered off and recrystallized from methanol. The 2,3-pentamethylene-5-chloroindole melts at 131–132° C.

*Analysis.*—Calculated for $C_{13}H_{14}ClN$: Cl, 16.15%; N, 6.38%. Found: Cl, 16.05%; N, 6.10%.

EXAMPLE 12

*1-(beta-dimethylaminoethyl)-2,3-pentamethyleneindole*

This is prepared in the same manner as Example 1, using 9.26 grams (0.05 mole) 2,3-pentamethyleneindole, 3.0 grams sodium hydride and 5.38 grams of beta-dimethylaminoethylchloride. The product has a B.P.: 131–136°/0.05 mm. Fumarate salt: M.P.: 219–221°.

*Analysis.*—Calculated for $C_{17}H_{24}N_2$ (base): C, 79.63%; H, 9.44%; N, 10.93%. Found: C, 79.65%; H, 9.29%; N, 11.00%. Calculated for $C_{21}H_{28}O_4N_2$ (fumarate): C, 67.72%; H, 7.58%; N, 7.52%. Found: C, 67.70%; H, 7.38%; N, 7.41%.

EXAMPLE 13

*1-(beta-dimethylaminoethyl)-2,3-hexamethyleneindole*

This is prepared in the same manner as Example 3, using 2,3-hexamethyleneindole, 9.96 grams; 3.0 grams sodium hydride (48%); and 5.38 grams beta-dimethylaminoethylchloride.

The product base has B.P.: 180–183°/.3; Fumarate M.P.: 198.5–201°.

*Analysis.*—Calculated for $C_{18}H_{26}N_2$ (base): C, 79.95%; H, 9.69%; N, 10.36%. Found: C, 79.85%; H, 9.46%; N, 10.34%. Calculated for $C_{22}H_{30}N_2O_4$ (fumarate): C, 68.36%; H, 7.82%; N, 7.25%. Found: C, 68.32%; H, 8.04%; N, 7.28%.

EXAMPLE 14

*1-(beta-piperidinoethyl)-2,3-hexamethyleneindole*

This is prepared essentially according to Example 5 from 2,3-hexamethyleneindole (9.96 g., 0.05 M), sodium hydride (3.0 g. of 48% dispersion, 0.055 M), N-beta-chloroethylpiperidine (7.38 g., 0.05 M) in dimethylformamide (95 ml.). Fumarate M.P. 224–224.5° C. (dec.).

*Analysis.*—Calculated for $C_{25}H_{34}N_2O_4$: C, 70.39%; H, 8.03%; N, 6.57%. Found: C, 70.30%; H, 8.16%; N, 6.44%.

EXAMPLE 15

*1-(gamma-dimethylaminopropyl)-2,3-tridecamethyleneindole*

This is prepared essentially according to Example 1 from 2,3-tridecamethyleneindole (8.93 g., 0.03 M), sodium hydride (1.8 g. of 48% dispersion, 0.033 M), gamma-dimethylaminopropylchloride (3.7 g., 0.03 M) in dimethylformamide (65 ml.). Fumarate M.P. 147.5–149° C.

*Analysis.*—Calculated for $C_{30}H_{46}N_2O_4$: C, 72.25%; H, 9.30%; N, 5.62%. Found: C, 72.11%; H, 9.38%; N, 5.71%.

EXAMPLE 16

*1-(alpha-phenyl-beta-dimethylaminoethyl)-2,3-pentamethyleneindole*

This is prepared essentially according to Example 1 from 2,3-pentamethyleneindole (9.25 g., 0.05 M), sodium hydride (3.0 g. of 48% dispersion, 0.055 M), N,N-dimethyl-beta-phenyl-beta-chloroethylamine (9.20 g., 0.05 M) and dimethylformamide. Product M.P. 120–122° C.

*Analysis.*—Calculated for $C_{23}H_{28}N_2$: C, 83.08%; H, 8.49%; N, 8.43%. Found: C, 82.84%; H, 8.55%; N, 8.23%.

Fumarate: M.P. 195–197° C.

*Analysis.*—Calculated for $C_{27}H_{32}N_2O_4$: C, 72.27%; H, 7.19%; N, 6.25%. Found: C, 72.27%; H, 7.20%; N, 6.18%.

EXAMPLE 17

*1-(gamma-[4-methyl]piperazinopropyl)-2,3-pentamethyleneindole*

This is prepared essentially according to Example 1 from 2,3-pentamethyleneindole (5.12 g., 0.0276 M), sodium hydride (1.66. g. of 48% dispersion, 0.0304 M), 1-methyl - 4-(gamma - chloropropyl)piperazine (4.90 g., 0.0276 M) and dimethylformamide (50 ml.). Difumarate M.P. 217.5–218.5° C.

*Analysis.*—Calculated for $C_{29}H_{39}N_3O_8$: C, 62.46%; H, 7.05%; N, 7.54%. Found: C, 62.41%; H, 7.33%; N, 7.47%.

EXAMPLE 18

*1-(gamma-[4-methylpiperazino]propyl)-2,3-hexamethyleneindole*

This is prepared essentially as in Example 1 from 2,3-hexamethyleneindole (5.50 g., 0.0276 M), sodium hydride (1.66 g. of a 48% dispersion, 0.0304 M), 1-methyl-4-(gamma chloropropyl)piperazine (4.90 g., 0.0276 M) and dimethylformamide (50 ml.). Dihydrochloride M.P. 239–242° C.

*Analysis.*—Calculated for $C_{22}H_{33}N_3 \cdot 2HCl$: N, 10.19%; Cl, 17.17%. Found: N, 10.05%, Cl, 17.19%.

Difumarate, M.P. 216–217° C.

*Analysis.*—Calculated for $C_{30}H_{41}N_3O_8$: C, 63.06%; H, 7.23%; N, 7.35%. Found: C, 62.60%; H, 7.26%; N, 7.24%.

EXAMPLE 19

*1-(gamma-dimethylaminopropyl)-2,3-pentamethylene-5-nitroindole*

This is prepared essentially as in Example 1 from 2,3-pentamethylene-5-nitroindole (4.6 g., 0.02 M), sodium hydride (1.2 g. of 48% dispersion), gamma-dimethylaminopropylchloride (2.5 g., 0.02 M) and dimethylformamide (50 ml.). Product M.P. 77.5–80° C.

*Analysis.*—Calculated for $C_{18}H_{25}N_3O_2$: C, 68.54%; H, 7.99%; N, 13.32%. Found: C, 68.70%; H, 8.09%; N, 13.12%.

Fumarate M.P. 178–180° C.

*Analysis.*—Calculated for $C_{22}H_{29}N_3O_6$: N, 9.74%. Found: N, 9.92%.

Hydrochloride M.P. 220–223° C.

*Analysis.*—Calculated for $C_{18}H_{26}ClN_3O_2$: C, 61.44%; H, 7.45%; N, 11.94%; Cl, 10.08%. Found: C, 61.26%; H, 7.49%; N, 12.04%; Cl, 10.04%.

The 2,3-pentamethylene-5-nitroindole employed as starting material in this example is prepared by refluxing for one hour a mixture of 51.1 g. of p-nitrophenylhydrazine, 37.5 g. of cycloheptanone, and 900 ml. of absolute ethanol. On cooling, cycloheptanone p-nitrophenylhydrazone crystallizes and is filtered off and dried. M.P. 142–143° C. This is cyclized by refluxing for one hour with four times its weight of glacial acetic acid saturated with dry hydrogen chloride. The cyclized product crystallizes on cooling, and is recrystallized from methanol. M.P., 164–165° C.

*Analysis.*—Calculated for $C_{13}H_{14}N_2O_2$: C, 67.81%; H, 6.13%; N. 12.17%. Found: C, 67.72%; H, 6.24%; N, 12.15%.

EXAMPLE 20

(a) *1-(beta-cyanoethyl)-2,3-hexamethyleneindole*

This is prepared essentially according to Example 9(a) from 2,3-hexamethyleneindole (99.7 g., 0.5 M), acrylonitrile (29.2 g., 0.55 M) and trimethylbenzylammonium methoxide (2 ml. of a 40% methanolic solution) in benzene (300 ml.).

*Analysis.*—Calculated for $C_{17}H_{20}N_2$: C, 80.91%; H, 7.99%; N, 11.10%. Found: C, 81.02%; H, 7.80%; N, 11.13%.

(b) *1-(gamma-aminopropyl)-2,3-hexamethyleneindole*

This is prepared essentially according to Example 9(b) from 1 - (beta-cyanoethyl) - 2,3 - hexamethyleneindole (27.0 g., 0.107 M), lithium aluminum hydride (6.5 g., 0.17 M), benzene (175 ml.) and ether (500 ml.). Product boils at 162–165° C./0.1 mm., $n_D^{20}$ 1.5959.

*Analysis.*—Calculated for $C_{17}H_{24}N_2$: C, 79.64%; H, 9.44%; N, 10.93%. Found: C, 79.61%; H, 9.44%; N, 10.65%.

EXAMPLE 21

*1-(gamma-dimethylaminopropyl)-2,3-pentamethylene-5-aminoindole*

1-(gamma-dimethylaminopropyl) - 2,3-pentamethylene-5-nitroindole fumarate (4.5 g., 0.01 M) is dissolved in 100 ml. of methanol and hydrogenated over 100 mgs. of $PtO_2$ at 45 p.s.i. and 25° C. When hydrogen uptake ceases (after 4 hours) the catalyst is filtered off and the solvent removed under vacuum. The residue is taken up in water, basified with 10% sodium hydroxide and extracted into ether. The ether layer is water-washed and dried; after filtering, the filtrate is treated with dry hydrogen chloride. The dark gummy precipitate is washed by decantation with ether and then crystallized from isopropyl alcohol. M.P.: 260–261°.

*Analysis.*—Calculated for $C_{18}H_{27}N_3.2HCl$: N, 11.73%; Cl, 19.78%. Found: N, 11.70%; Cl, 19.50%.

EXAMPLE 22

*1-(gamma-di-[2-hydroxyethyl]aminopropyl)-2,3-hexamethyleneindole*

To a solution of 11.5 grams (0.045 mole) 1-(gamma-aminopropyl) - 2,3-hexamethyleneindole in 50 ml. of methanol is slowly added 4.4 grams (0.1 mole) of ethylene oxide. After standing 2 days the solvent is evaporated off and the residue distilled. This yields 12 grams (77.5%) of product; B.P.; 245–50°/.001 mm.

*Analysis.*—Calculated for $C_{21}H_{32}N_2O_2$: C, 73.20%; H, 9.36%; N, 8.13%. Found: C, 72.98%; H, 9.62%; N, 7.92%.

EXAMPLE 23

*1-(gamma-dimethylaminopropyl)-2,3-octamethyleneindole*

This is prepared essentially according to Example No. 1 from 2,3-octamethyleneindole (5.68 g., 0.025 M), gamma-dimethylaminopropyl chloride (3.25 g., 0.025 M), sodium hydride (1.53 g. of 48% dispersion, 0.028 M) in dimethylformamide (55 ml.). The fumarate melts with decomposition at 174–176° C.

*Analysis.*—Calculated for $C_{25}H_{36}N_2O_4$: C, 70.06%; H, 8.47%; N, 6.54%. Found: C, 69.81%; H, 8.20%; N, 6.58%.

The 2,3-octamethyleneindole required as starting material in this example is prepared by the method of Buu-Hoi (J. Chem. Soc., 2882–8, 1949) as follows: A mixture of 11.87 g. cyclodecanone and 24.9 g. phenylhydrazine is heated to about 100° C. until steam ceases to be evolved. The mixture is cooled, and 15 cc. of glacial acetic acid saturated with dry hydrogen chloride is added cautiously. The mixture is boiled for 5 minutes and poured into water. The crude product is dissolved in benzene, washed with water, dried, and distilled. A viscous oil distilling at 152° C/0.3 mm. Hg is recrystallized from alcohol and water. M.P., 92–93° C.

*Analysis.*—Calculated for $C_{16}H_{21}N$: C, 84.53%; H, 9.30%; N, 6.16%. Found: C, 84.25%; H, 9.31%; N, 6.13%.

EXAMPLE 24

*1-(gamma-piperazinopropyl)-2,3-pentamethyleneindole*

This is prepared essentially according to Example No. 1 from 2,3-pentamethyleneindole (5.56 g., 0.03 M), sodium hydride (1.8 g., 0.033 M of 48% dispersion) and a benzene solution of N-(gamma-chloropropyl)-piperazine (obtained from 7.78 g. of hydrochloride, 0.033 M in 50 ml. dimethylformamide. Difumarate M.P. 172–174° C. (dec.).

*Analysis.*—Calculated for $C_{28}H_{37}N_3O_8$: C, 61.86%; H, 6.86%; N, 7.73%. Found: C, 61.73%; H, 9.96%; N, 7.98%.

EXAMPLE 25

*1-(beta-morpholinoethyl)-2,3-hexamethyleneindole*

This is prepared essentially according to Example No. 1 from 2,3-hexamethyleneindole (9.96 g., 0.05 M), sodium hydride (3.0 g., 0.055 M of 48% dispersion) and N-(chloroethyl)morpholine (7.5 g., 0.05 M) in 75 ml. dimethylformamide. Fumarate M.P. 174–176° C. (dec.).

*Analysis.*—Calculated for $C_{24}H_{32}N_2O_5$: C, 67.27%; H, 7.53%; N, 6.53%. Found: C, 66.97%; H, 7.45%; N, 6.50%.

EXAMPLE 26

*1-(beta-pyrrolidinoethyl)-2,3-hexamethyleneindole*

This is prepared essentially according to Example No. 1 from 2,3-hexamethyleneindole (7.98 g., 0.04 M), sodium hydride (2.4 g., 0.044 M of 48% dispersion) and N-(chloroethyl) pyrrolidine (5.35 g., 0.04 M) in 60 ml. dimethylformamide. Fumarate M.P. 231–233° C. (dec.).

*Analysis.*—Calculated for $C_{24}H_{32}N_2O_4$: C, 69.88%; H, 7.83%; N, 6.79%. Found: C, 69.94%; H, 7.76%; N, 6.89%.

EXAMPLE 27

(a) *1-(beta-carboethoxyethyl)-2,3-pentamethyleneindole*

Forty grams (0.17 mole) of 1-(beta-cyanoethyl)-2,3-pentamethyleneindole, prepared as described in Example 9(a), is dissolved in 300 ml., of absolute ethanol. The resulting solution is saturated with dry hydrogen chloride, 2 ml. of water is added, and the mixture boiled under reflux for two hours and then cooled to room temperature. Ammonium chloride which separates is filtered off and the filtrate concentrated in vacuo. The residue is taken up in ether, water-washed, and dried. The solvent is then evaporated and the product distilled. The yield is 31 grams of material boiling between 220 and 225° C. at 0.05 mm. Hg.

*Analysis.*—Calculated for $C_{18}H_{23}NO_2$: C, 75.75%; H, 8.12%; N, 4.91. Found: C, 75.56%; H, 8.26%; N, 4.79.

(b) *1-(gamma-hydroxypropyl)-2,3-pentamethyleneindole*

A solution of 1-(beta-carboethoxyethyl)-2,3-pentamethyleneindole (31 grams, 0.11 mole) in 200 cc. dry ether is added slowly to a stirred suspension of 3 grams (0.05 mole) of lithium aluminum hydride in 200 cc. dry ether. After 4 hours refluxing the reaction mixture is cooled, 12 cc. of water is added dropwise, and then 50 cc. isopropanol. The suspension is filtered, the filter-cake washed well with isopropanol, the combined filtrates concentrated and the residue distilled, B.P.: 210–215°/.05 mm. Yield 22 grams (82.3%).

*Analysis.*—Calculated for $C_{16}H_{21}NO$: C, 78.90%; H, 8.70%. Found: C, 78.84%; H, 8.40%.

(c) *1-(gamma-bromopropyl)-2,3-pentamethyleneindole*

5 grams (0.02 mole) of 1-(gamma-hydroxypropyl)-2,3-pentamethyleneindole, 10 cc. 48% aqueous hydrogen bromide, and 2 cc. of conc. sulfuric acid are placed in a 25 cc. round-bottomed flask and refluxed 1½ hours. The mixture is cooled, poured onto ice, and extracted with ether. The extract is washed successively with water, sodium bicarbonate solution, and water, and then dried over sodium sulfate. Solids are filtered off and the filtrate concentrated. The residue is distilled under vacuum yielding 2.8 grams product, B.P.: 185–190°/0.05 mm.

*Analysis.*—Calculated for $C_{16}H_{20}NBr$: C, 62.75%; H, 6.58%; N, 4.57; Br, 26.08%. Found: C, 63.88%; H, 6.77%; N, 4.49%; Br, 25.92%.

(d) *1-(gamma-[4-(beta-hydroxyethyl)piperazino]propyl)-2,3-pentamethyleneindole*

Eight grams (0.026 moles) 1-(gamma-bromopropyl)-2,3-pentamethyleneindole and N-(beta-hydroxyethyl) piperazine (3.9 grams, 0.03 mole) in 100 cc. xylene are heated under reflux for 24 hours. After cooling, the mixture is washed with aqueous potassium carbonate, then with water. The organic layer is dried over magnesium sulfate, and after filtration the solution is diluted with ether and dry hydrogen chloride is added. A precipitate is separated and twice crystallized from alcohol. M.P. 209–210°.

*Analysis.*—Calculated for $C_{22}H_{35}N_3Cl_2O$: N, 9.82%; Cl, 16.55%. Found: N, 9.52%; Cl, 16.70%.

EXAMPLE 28

*1-(gamma-dimethylaminopropyl)-2,3-pentamethylene-5-methylindole*

This is prepared by the procedure of Example No. 1 substituting 2,3-pentamethylene-5-methylindole for the 2,3-pentamethyleneindole employed in Example 1. The product is isolated and crystallized as the fumaric acid salt, M.P. 141.5–145° C.

*Analysis.*—Calculated for $C_{23}H_{32}O_4N_2$: C, 68.97%; H, 8.05%; N, 7.00%. Found: C, 68.75%; H, 8.01%; N, 6.96%.

The 2,3-pentamethylene-5-methylindole employed as started material in this example is prepared from cycloheptanone and p-methylphenyl-hydrazine by the process outlined in the second paragraph of Example 11. M.P., 123–127° C.

*Analysis.*—Calculated for $C_{14}H_{17}N$: C, 84.37%; H, 8.60%; N, 7.03%. Found: C, 84.36; H, 8.52%; N, 6.94%.

EXAMPLE 29

*1-(gamma-methylaminopropyl)-2,3-hexamethyleneindole*

(a) 1-(beta-carbomethoxyethyl)-2,3-hexamethyleneindole is prepared from 75.8 g. of 1-(beta-cyanoethyl)-2,3-hexamethyleneindole (prepared as described in Example 20(a)) by following the general procedure of Example 27(a), using 1250 ml. of methanol and 5 ml. of water. The product has a melting point of 62–64° C.

*Analysis.*—Calculated for $C_{18}H_{23}O_2N$: C, 75.75%; H, 8.12%; N, 4.91%. Found: C, 75.49%; H, 8.10%; N, 4.94%.

(b) 1-(beta-carbomethamidoethyl)-2,3-hexamethyleneindole is prepared by dissolving 10 grams of 1-(beta-carbomethoxyethyl)-2,3-hexamethyleneindole (prepared as in part (a) of this example) in 50 ml. of methanol saturated at 0° C. with methyl amine. After standing at room temperature for 48 hours, the solvent is evaporated by heating on the steam bath. Recrystallization from methanol gives a colorless product melting at 115–116° C.

*Analysis.*—Calculated for $C_{18}H_{24}N_2O$: C, 76.05%; H, 8.50%; N, 9.86%. Found: C, 75.83%; H, 8.50%; N, 9.84%.

(c) Eleven grams of the product of part (b) of this example is dissolved in about 500 ml. of benzene and then added to a solution of 10 grams of lithium aluminum hydride dissolved in 1000 ml. of anhydrous ether. After decomposition of the complex by addition of about 25 ml. of water, the mixture is filtered, the filtrate dried, and the solvent evaporated off. The residue is distilled to yield 1-(gamma-methylaminopropyl-2,3-hexamethyleneindole, B.P. 160–170° C. at 0.1 mm. Hg. A portion of the base is converted to the hydrochloride salt, M.P. 180–181° C.

*Analysis.*—Calculated for $C_{18}H_{26}N_2$ (base): C, 79.95%; H, 9.69%; N, 10.36%. Found: C, 79.83%; H, 9.82%; N, 10.25%. Calculated for $C_{18}H_{27}N_2Cl$ (hydrochloride): C, 70.45%; H, 8.87%; N, 9.13%. Found: C, 70.76%; H, 9.00%; N, 9.41%.

We claim:
1. A substance selected from the group consisting of bases having the formula

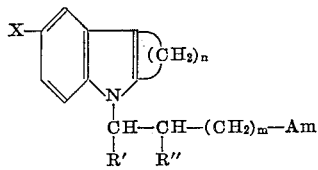

wherein X represents a member of the group consisting of hydrogen, methyl, halogen, nitro and amino, R' is a member of the group consisting of hydrogen and phenyl, R" is a member of the group consisting of hydrogen and methyl, m is selected from the group consisting of zero and one, n is an integer of from 5 to 13 inclusive, and Am is a member selected from the group consisting of amino, lower alkylamino, diloweralkylamino, hydroxyloweralkylamino, piperidino, morpholino, pyrrolidino, piperazino, lower alkyl piperazino and hydroxy lower alkyl piperazino of no more than 8 carbon atoms, and the acid addition salts of said bases with pharmaceutically acceptable acids.

2. 1-(gamma-dimethylaminopropyl)-2,3-pentamethyleneindole.
3. 1-(gamma-dimethylaminopropyl)-2,3-hexamethyleneindole.
4. 1-(beta-piperidinoethyl)-2,3-pentamethyleneindole.
5. 1-(beta-dimethylaminoethyl)-2,3-hexamethyleneindole.
6. 1-(gamma-dimethylaminopropyl)-2,3-octamethyleneindole.
7. 1-(gamma-dimethylaminopropyl)-2,3-pentamethylene-5-aminoindole.
8. 1-(gamma-dimethylaminopropyl)-2,3-tridecamethyleneindole.
9. 1-(gamma-monomethylaminopropyl)-2,3-hexamethyleneindole.
10. 1-(beta-pyrrolidinoethyl)-2,3-pentamethyleneindole.
11. 1-(gamma-dimethylaminopropyl)-2,3-pentamethylene-5-fluoroindole.
12. 1-(gamma-dimethylaminopropyl)-2,3-pentamethylene-5-nitroindole.
13. 1-(gamma-[4-(beta-hydroxyethyl)piperazine]-propyl)-2,3-pentamethyleneindole.
14. A compound having the formula:

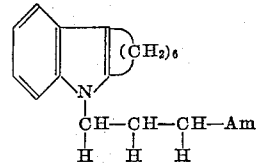

wherein Am is a member selected from the group consisting of amino, lower alkylamino, diloweralkylamino, hydroxyloweralkylamino, piperidino, morpholino, pyrrolidino, piperazino, lower alkyl piperazino and hydroxy lower alkyl piperazino.

References Cited by the Examiner
UNITED STATES PATENTS

| | | | |
|---|---|---|---|
| 2,426,465 | 8/1947 | Miller et al. | 260—315 |
| 2,528,939 | 11/1950 | Wright | 260—315 |
| 2,541,211 | 2/1951 | Cusic et al. | 260—315 |
| 2,687,414 | 8/1954 | Cusic | 260—315 |
| 2,908,691 | 10/1959 | Robinson | 260—319 |
| 2,909,530 | 10/1959 | Rudner | 260—319 |
| 2,942,001 | 6/1960 | Druey et al. | 260—268 |
| 2,943,090 | 6/1960 | Semb et al. | 260—268 |

OTHER REFERENCES

Richter: The Chemistry of the Carbon Compounds, vol. II, 1939, pages 1–2.

Elderfield, Ed.: Heterocyclic Compounds, vol. 3, John Wiley and Sons, Inc., New York, 1952, pages 298–299.

Finar: Organic Chemistry, volume I, Longmans, Green and Co., New York, 1959, pages 42 and 445.

ALEX MAZEL, *Primary Examiner.*

IRVING MARCUS, NICHOLAS S. RIZZO, WALTER A. MODANCE, *Examiners.*

HENRY R. JILES, E. E. BERG, M. O'BRIEN, *Assistant Examiners.*